Aug. 11, 1953     H. R. BILLETER     2,648,134
MICROMETER GAUGE
Filed Aug. 2, 1950
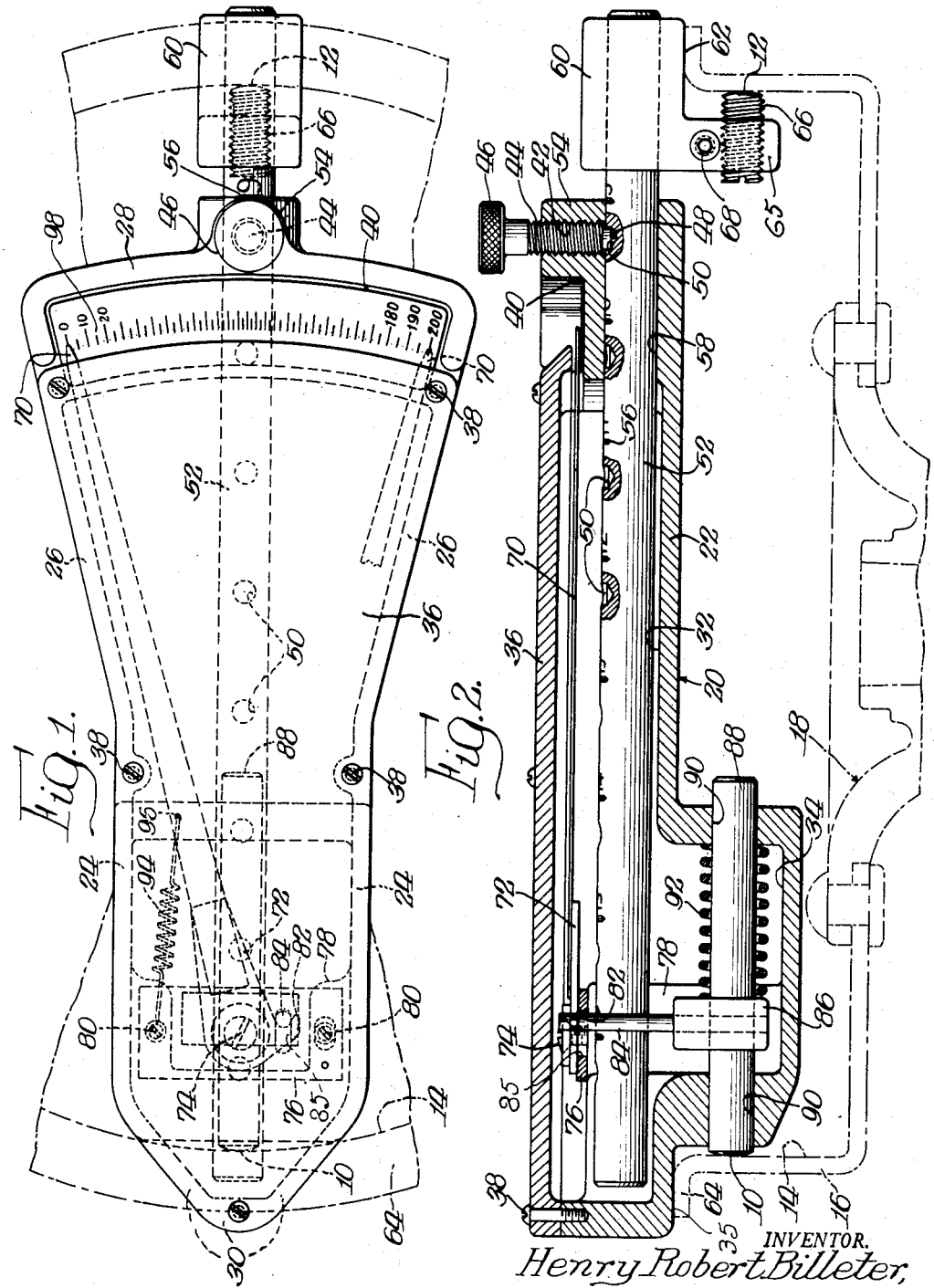
INVENTOR.
Henry Robert Billeter,
BY
Fidler, Crouse + Cassidy
Atty's.

Patented Aug. 11, 1953

2,648,134

UNITED STATES PATENT OFFICE 2,648,134

MICROMETER GAUGE

Henry Robert Billeter, Highland Park, Ill., assignor to Ammco Tools, Inc., North Chicago, Ill., a corporation of Illinois Application August 2, 1950, Serial No. 177,220

6 Claims. (Cl. 33—147)

The present invention relates generally to micrometer gauges and has reference particularly to a micrometer gauge of simple and rugged construction especially well adapted for accurately and quickly determining the diameter of the inside surface of an automotive brake drum.

In automotive shop practice, brake installation or adjustment procedure requires an accurate knowledge of the condition of the inside surface of a brake drum in order that the brake shoes employed in connection therewith may be ground to a proper radius to fit the drum. Also it is necessary to determine whether the drum is out-of-round so that it can be machined or ground to a true cylindrical surface. Often a brake drum is encountered which is oversize for some reason, as for example one which has, due to previous wear, been turned down on a lathe to restore the drum surface to its true smooth cylindrical shape. As a consequence, it is essential that the particular oversize dimension which the drum has assumed be known in order that a corresponding allowance be made when fitting the drum with brake shoes. When a drum is encountered that is out-of-round, it is of course necessary to determine the maximum diameter or the point of greatest eccentricity on the surface of the drum in order that the latter may be machined or ground to an over-all radius at least equaling the radius of the drum at the point of greatest eccentricity.

Many gauges heretofore proposed for use in measuring the inside diameter of brake drums have been either too delicate in construction to withstand the rough usage that may be expected in practice or they have been so awkward and cumbersome that they have not found universal acceptance. Many of these devices have involved the use of sliding scales or indexes which must be carefully adjusted to an initial position, whereafter an additional adjustment must be made to permit an exact reading. Such gauges, which require careful adjustment and often some calculation, are not suited for use where maximum production is desired, or where relatively unskilled labor is employed.

The principal object of the present invention, therefore, is to provide a very simple and compact brake drum micrometer gauge which is rugged and durable and capable of withstanding rough usage, yet which will, when applied to a brake drum, give an accurate measurement of the diameter thereof across any two selected diametrically opposed points on the drum.

Another object of the invention is to provide such a device which may, by a simple operation involving no intricate adjustments, be pre-set to a selected condition corresponding to any one of a plurality of standard brake drum diameters and which may thereafter be readily applied to the drum for measuring its diameter without the exercise of any particular skill and which will, thereupon, instantly and automatically give a true reading of any oversize diameter, up to the limit of the device.

Another object of the invention is to provide a device of the character briefly outlined above which may readily be applied to the brake drum to measure the internal diameter thereof across any two diametrically opposed points and which thereafter may be turned about the drum axis, while in measuring engagement with the drum, to indicate the diameter at each point in its turning movement and thus any out-of-round condition that may exist.

Yet another object of the invention is to provide a brake drum micrometer gauge having associated therewith a scale including a pointer which, upon proper application of the micrometer to the brake drum, will give a visual indication of any oversize that may exist in connection with the brake drum, up to the maximum oversize normally encountered in brake drum grinding practice, and which pointer is so actuated that it will not be thrown off scale and bent or damaged should the brake drum be undersize or should an obstruction such as a piece of foreign material adhering to the surface of the brake drum be encountered by the gauge as it is moved into initial measuring position or around the drum.

Other objects and advantages will appear from the following description taken in connection with the appended drawing, wherein:

Figure 1 is a top plan view of a micrometer gauge constructed in accordance with the present invention and showing the same in its condition when applied in measuring position to a cylindrical brake drum; and Fig. 2 is substantially a longitudinal sectional view through the device of Fig. 1.

The improved gauge of the present invention is shown for the purpose of illustration as applied in measuring position to a so-called 9 inch brake drum 18 which is in new condition and of true diameter; that is, the drum measures exactly 9 inches in diameter across the inner surface 14 of the flange 16.

The gauge includes in its general organization a support 20 which preferably takes the form of a casing, which may be formed as a casting, and which includes a bottom wall 22, a pair of side walls 24 which diverge forwardly as at 26, a is shown for the purpose of illustration as ap- curved front wall 28 and a rear wall 30 which tapers rearwardly. The bottom wall 22 is formed with a principal portion 32 and an offset guide portion 34. The bottom wall 22 is also provided with a lower surface or rest 35 at its rear end which is adapted for engagement with the rim 64 of the brake drum 18 to support that end of the device.

A cover plate 36 is suitably secured to the upper rim of the casing 20 as by screws 38 or the like and extends from the rear of the casing to a region short of the front wall 28. The casing 20 includes an arcuate shelf or ledge portion 40 which carries a scale 98, and the forward edge of the cover plate extends over the rear portion of the ledge 40 to substantially close the casing but terminates short of the scale 98, and is slightly spaced from the ledge for a purpose which will appear.

The gauge is adapted to be adjusted for use with brake drums of various standard sizes. The guage of the present illustrative embodiment is designed to measure 9 inch, 10 inch, 11 inch, 12 inch, 13 inch, 14 inch, 15 inch and 16 inch drums. To permit such adjustment I provide a gauge bar 52 which is slidably disposed in a bore 58 extending through a boss 54 in the front wall 28, and in its rearward position (as shown in Fig. 2) it overlies both the principal portion 32 and the guide portion 34 of the bottom wall 22. The forward end of the gauge bar 52 has mounted thereon a head 60 having a lower surface 62 which constitutes a second rest for the apparatus and is designed for engagement with the rim 64 of the brake drum 18.

The head 60 is provided with a laterally extending split arm 65 and a calibrating screw 66 threaded through the arm 65 while a tightening screw 68 is threaded through the split arm 65 serving to clamp the calibrating screw 66 in any desired position of adjustment. The calibrating screw 66 is provided with an arcuate forward end which serves as a reference surface 12 and is adapted for engagement with the inner surface 14 of the annular flange 16 of the brake drum 18 when the apparatus is in position on the latter. The arcuate surface engages the drum over a very small area with substantially point contact.

The gauge is adjusted for measuring the diameter of any particular size of drum by moving the gauge bar to a position in the casing corresponding to the standard size of the drum to be measured. For example, in the drawing the gauge is shown as being adjusted to measure a 9 inch drum. Suitable indexing means are provided for accurately establishing the several positions of the gauge bar.

To this end the front wall 28 is provided with a vertical bore 42 threaded to receive a clamping screw 44 having a knurled head 46. The end of the screw is tapered as at 48 for selective reception in any one of a plurality of indexing recesses 50 in the gauge bar. The recesses 50 are so located as to establish the desired positions of the gauge bar when engaged by the clamping screw. In the illustrated embodiment the recesses are 1 inch apart and are so located with respect to the reference surface 12 that the gauge may be adjusted to measure drums of 9 to 16 inches in diameter.

The front vertical surface of the boss 54 may conveniently serve as an index surface. Accordingly a reference mark 56 is provided for each recess 50 and so located that when any such mark is aligned with the front vertical surface of the boss, the corresponding recess will be positioned in alignment with the screw 44. For convenience, the index marks preferably are appropriately labeled.

Slidably disposed in the guide portion 34 of the casing is a gauge pin 88, the rear, outer end 10 of which is arcuate and provides a measuring surface adapted to contact the drum wall with a point contact when the gauge is in measuring position. The gauge pin 88 is so mounted that the measuring surface 10 moves along a straight path in alignment with the reference surface 12 between a retracted position, in which its end surface 10 is flush with the outer, rear face of the guide portion 34, through a "zero" position in which the pin 88 projects slightly from the rear of the guide portion 34, to a projected position more remote from the reference surface 12 than the zero position. The gauge pin 88 is yieldably urged toward its projected position by a coil spring 92 surrounding the pin 88 and bearing at one end against the front end wall of the guide portion 34 and at the other end against a collar 86 secured on the pin 88.

The collar 86 carries an upstanding operating finger 84 which extends through a slot 85 formed in a bracket 78 extending between a pair of lugs 78 interiorly of the casing 22 and secured to the lugs 78 by screws 80. The upper end of the finger 84 is received in a hook portion 82 of a pointer hub or carrier 72 pivotally supported in the casing on a screw 74 threaded into the bracket 78. The hub 72 carries a pointer 70 which extends forwardly of the casing and has its outer end overlying the scale 98 for indicating relationship therewith.

The spring 92 normally urges the gauge pin 88 into its projected position and such movement of the pin 88 causes corresponding movement of the finger 84, which in turn moves the pointer in a clockwise direction (as viewed in Fig. 1) about its pivot and to the upper end of the scale 98. The several members of the gauge are so designed that the pointer stands at the upper end of the scale (in the position indicated in broken lines in Fig. 1) when the gauge pin 88 is in its projected position.

A tension spring 94 is secured at one end to one of the clamping screws 80 and at the other end to the pointer 70, at a point 96 thereon intermediate the ends, and the pointer is thus yieldably urged in a counterclockwise direction (as viewed in Fig. 1) so that the hook portion 82 of the pointer hub 72 engages and is maintained against the operating finger 84 except under certain conditions as hereinafter explained. The effect of the compression spring 92 on the pointer 70 is greater than the effect of the spring 94 and thus, in the normal position of the pointer when the apparatus is disengaged from the brake drum, the end of the pointer assumes a position at the high end of the scale S (as shown in dotted lines in Fig. 1), with the side of the pointer bearing against a portion of one of the side walls 24.

The parts are so designed that in the "zero" position of the gauge pin 88 the measuring surface 10 is spaced from the reference surface 12 a distance corresponding to the setting of the gauge bar 52. For example, if the gauge bar is set for measuring a 9 inch drum (as illustrated in Fig. 2) the distance between the reference surface 12, and the measuring surface 10, when the gauge pin 88 is in its zero position, is exactly 9 inches. When the gauge pin 88 is in such zero position the pointer 70 will be in a position at the "zero" or low end of the scale. From the foregoing it will be seen that the scale measures the distance which the measuring surface 10 is displaced from its zero position in the direction of its projected position. Thus, the gauge may be used to measure any dimension in excess of the dimension for which the gauge bar is set, up to the maximum range of the device. Where the gauge is designed for use in measuring brake drums the range preferably extends from zero to 0.200 inch. That is to say, if the gauge is set for measuring a 9 inch brake drum it will measure any dimension from 9 inches to 9.200 inches. The maximum amount of material which ordinarily may be removed safely from the inside of a brake drum is approximately 0.100 inch in depth. Accordingly, the maximum oversize which ordinarily is tolerated in a drum is 0.200 inch. Thus the gauge of the present invention preferably has a range of from zero to 0.200 inch for any particular setting of the gauge bar 52. The scale is calibrated accordingly from 0 to 200, the graduations indicating thousandths of an inch.

It is to be noted that linear movement of the gauge pin 88 in a direction parallel to the longitudinal axis of the casing 20 is translated to circular or arcuate movement of the end of the pointer 70. The portion of the finger 84 which is engaged by the hook portion 82 is maintained by the latter at a fixed distance from the pivot axis of the pointer 70 throughout the entire range of movement of the latter. This action is permitted by reason of the finger 84, together with the gauge pin 88, being free to rock about the longitudinal axis of the pin 88 as the pointer is moved. Sufficient clearance is provided between the finger 84 and the edges of the slot 85 to permit such rocking movement. Since the center of the engaged portion of the pin is on a radius normal to the longitudinal center line of the pointer, the latter moves a smaller angular distance while opposite the middle of the scale than while opposite either end, for equal increments of movement of the gauge pin. Accordingly, the spacings between successive graduations of scale S at the middle of the scale are less than such spacing at the high and low ends of the scale, as indicated somewhat diagrammatically in the drawing, the spacings increasing appropriately toward the ends to properly indicate the corresponding positions of the gauge pin 88.

To illustrate the operation of the apparatus let it first be assumed that the gauge is used to measure a 9 inch standard brake drum which is accurately dimensioned and not worn. If the clamping or indexing screw 46 is not already in register with and secured in the recess 50 labeled "9" it is brought into register with that recess and the bar 52 is secured in position by the clamping screw 44. The gauge is applied to the brake drum 18 by placing the rear end of the gauge pin 88 inside the brake drum in contact with the inner surface 14 thereof and allowing the surface 35 of the bottom wall 22 to rest on the rim 64 of the brake drum (as shown in Fig. 2). The gauge is then swung downwardly into the plane of the drum rim, whereupon the end of the calibrating screw 66 enters the drum in a region substantially diametrically opposed to the point of contact of the gauge pin 88 with the inner surface of the drum, and the surface 62 of the collar 60 is brought into engagement with the rim 64 of the drum. During the movement of the forward end of the gauge into the drum, the gauge pin 88 abuts the inside surface 14 of the drum and is forced forwardly in the casing against the action of the compression spring 92. The overtravel of the gauge pin to beyond its zero position permits easy insertion of the gauge in the drum. When the gauge is seated in the position with the surfaces 35 and 62 resting on the rim, the gauge pin 88 and calibrating screw 66 make their respective point contacts with the drum flange.

When the gauge is in its normal condition prior to insertion in the drum the gauge pin 88 is maintained in its projected position by the spring 92, and the pointer 70 accordingly stands at the high end of the scale 98. However, when the gauge is inserted in the drum, the gauge pin 88 is moved to its zero position and the pointer accordingly is moved to the zero end of the scale by the spring 94.

It may happen that in inserting the gauge in the drum it is not so placed that the reference surface 12 and measuring surface 10 contact the drum flange at diametrically opposite points therein. In that case the gauge pin 88 will be moved inwardly to beyond its zero position and toward its retracted position. However, owing to the fact that the finger 84 and hook portion 82 provide a one-way connection between the gauge pin 88 and the pointer 70, the latter will be halted in its zero position and will not be damaged. In order to determine whether the gauge is positioned properly in the drum it may be rocked about the reference surface 12 by the operator, who can determine by observing the scale and the highest reading thereon, the diameter of the drum.

The drum may then be gauged to determine whether any out-of-round condition exists by turning the gauge about the axis of the drum and observing the position of the pointer. Should the drum be oversize across any particular diameter, the gauge pin will, when the gauge is in position to measure such diameter, be moved outwardly from its zero position by the spring 92 and the pointer will be moved appropriately from the zero end of the scale toward the high end of the scale. The amount of oversize may then be read directly on the scale.

The procedure for measuring an oversize drum is substantially the same as just described. However, the pointer will at all times be positioned at a point on the scale between the zero end and the high end. In order to insure that the gauge is disposed diametrically of the drum, it is pivoted about the reference surface until the reading on the scale is a maximum. Thereafter the gauge is rotated about the axis of the drum to take readings at selected angular positions within the drum.

The gauge is so constructed that neither the actuating mechanism nor the pointer will be damaged should the gauge be applied to a drum which is undersize or which has an obstruction along the inner surface of the flange, or which is oversize an amount in excess of the range of the gauge. For example, should the gauge be applied to a drum which is undersize, the gauge pin 88 will be moved inwardly beyond its zero position and when the pointer reaches its zero position the finger will be disengaged from the hook portion. A similar action will take place should the gauge encounter an obstruction, as for example a protruding portion on the flange wall, in being rotated about the axis of the drum from one position to another. On the other hand, should the gauge be inserted in a drum which is oversize an amount greater than the range of the gauge, the gauge pin 88 will move toward its projecting position until the spring 92 is fully extended. The pointer 70 and the pin 84 are both made of spring material and hence even if the pointer should strike against the casing at either end of its travel, there would be no damage to the gauge.

Although the gauge of my invention has been illustrated as of such construction that it measures only oversize dimensions, it will be understood that the invention is not thus limited. The gauge of my invention may be so constructed that it measures both oversize and undersize dimensions. In this case the scale is so made that its "zero" point is intermediate its ends and the scale is graduated suitably in each direction from the zero point. Also the mechanism for actuating the pointer is arranged to provide a zero position for the gauge pin whereby when the latter is in such position the pointer stands opposite the zero position on the scale which in this case is intermediate the ends of the scale. The gauge as herein illustrated and described hereinbefore may be modified to provide this second mode of operation by merely substituting a scale having its zero position in the desired location intermediate the scale ends and graduated appropriately, and by suitably adjusting the calibrating screw 66 so that the zero position of the gauge pin 88 is properly located with reference to the scale markings. The gauge as thus modified is operated in a manner generally similar to that above described. Thus, when the gauge is applied to a drum of proper diameter the pointer will be moved from its initial position at one end of the scale to the zero position. However, if the drum is undersize or oversize, the pointer will be moved to a position an appropriate distance in either direction out of zero position, thereby to indicate the undersize or oversize.

While the gauge of the present invention is especially well adapted for measuring brake drum diameters and is described in connection with such use, it will be appreciated that the invention is not limited to such application. The gauge disclosed herein may be used for measuring other articles within the scope of its capabilities as will be apparent.

It will be seen from the foregoing that the gauge of the present invention is simple and rugged and not likely to become damaged even though subjected to relatively rough usage. The gauge is constructed of relatively few parts which may be manufactured and assembled readily and comparatively inexpensively. The parts are so constructed and arranged that they are not likely to get out of order or require adjustment during a long period of use.

The gauge is relatively simple to use and does not require complicated adjustments or settings. The only adjustment required is the setting of the gauge bar to the appropriate extent of projection corresponding to the standard size of the brake drum to be gauged. After such adjustment the gauge need only be inserted in the brake drum and the reading taken directly from the scale. No computations of any kind are required. The diameter of the drum between any two points may be readily measured and a complete series of measurements across successive diameters may be quickly taken without removing the gauge from the drum.

While in the present illustrative embodiment of the invention the gauge is shown as designed for measuring brake drums of common standard diameters from 9 to 16 inches, it will be understood that the invention is not thus limited. It will be appreciated that the gauge may be designed to measure brake drums of larger or smaller diameters and those which have diameters of other than even inches. For example, it may be designed to measure, in addition to brake drums of even inch diameters from 9 to 16 inches, also drums having diameters of 16½ inches, 17 inches and 17¼ inches.

I claim:

1. A brake drum gauge comprising an enclosing casing, a gauge bar mounted in and having an end projecting from said casing and adjustable for longitudinal movement therein, reference means on said projecting end having a longitudinally facing drum-engaging reference surface and being adjustable on the gauge bar along the line of movement of the latter, a gauge pin disposed in said casing for free sliding movement and having an end projecting from said casing and provided with a drum-engaging measuring surface facing longitudinally oppositely from the reference surface, means for fixedly positioning said gauge bar in any selected one of a plurality of predetermined spaced positions relative to the casing to vary the normal distance between said surfaces, said reference means being adjustable on said gauge bar to vary the distance between said surfaces relative to any one of said predetermined positions, said gauge pin being movable independently of the gauge bar, and in a direction parallel thereto between a retracted position through a zero position to an advanced position to vary the distance between said surfaces, means for urging said gauge pin toward its normal projected position, a scale in said casing, a movable pointer in said casing and cooperating with said scale, and means actuated by said gauge pin for moving said pointer to indicate on said scale any position of the drum-engaging surface of said gauge pin outwardly of its zero position.

2. A brake drum gauge comprising a frame including parts freely slidable in relatively extending and contracting directions, means for fixedly positioning the frame parts in any selected one of a plurality of positions relative to each other, each part having a rest portion with the rest portions at opposite ends of the frame adapted for engagement with substantially diametrically opposed regions of a brake drum rim respectively, a normally fixed, adjustable locating abutment on one part of said frame adjacent the respective rest portion and having a surface shaped for substantially point contact with the inner surface of the drum when the adjacent rest portion is in position on the drum rim, a gauge pin freely slidable in the other part of said frame, in parallel relation thereto and having an end projecting therefrom in the vicinity of the other rest portion and having a surface shaped for substantially point contact with the inner surface of said drum at a point diametrically opposed from the point of contact of said locating abutment, yieldable means normally urging said gauge pin in a direction to engage the inner surface of the drum when said rest portions are in position on the drum rim, a scale on said frame, a pointer pivoted on said frame in cooperative relationship with said scale, and means for translating the linear sliding movement of said gauge pin into swinging movement of the pointer.

3. A brake drum gauge having a casing adapted for positioning diametrically across the brake drum, a gauge bar mounted in said casing and adjustable longitudinally to any of a number of predetermined positions relative to said casing, means on said gauge bar adjustable longitudinally therealong and having a reference surface shaped for substantially point contact engagement with the brake drum, a gauge pin disposed in said casing for free sliding motion therein along a line parallel with said gauge bar and having an end projecting from the casing providing a movable measuring surface shaped for substantially point contact engagement with the brake drum, yieldable means normally urging said gauge pin in a direction tending to increase the distance between said reference and measuring surfaces, an operating finger on said gauge pin and movable bodily therewith and swingable about the longitudinal axis of the gauge pin, a scale on said casing, a pointer having one end thereof pivoted to said casing for swinging movement about an axis spaced from the path of movement of said operating finger and having its other end overlying said scale and adapted to traverse the same during swinging movement of the pointer, a limit stop for said pointer at each end of said scale, spring means normally urging said pointer against one of said limit stops, an arm on said pointer positioned in the path of movement of said operating finger and being held in engagement with the latter under the influence of said spring, said yieldable means causing said operating finger to bear against said arm with a force sufficient to maintain said pointer in engagement with the other limit stop.

4. A gauge of the character described comprising a frame having parts freely slidable in relatively extending and contracting directions, means for locking said parts in any of a number of predetermined positions relative to each other, said parts having cooperating indicia for indicating said positions, normally fixed adjustable means on one of said parts providing a reference surface, the other part constituting an enclosing casing, a gauge pin disposed in said casing for free sliding movement parallel to said frame, and having an end projecting therefrom providing a movable measuring surface, said gauge pin being movable from a retracted position to an advanced position to increase the distance between said reference and measuring surfaces, an operating finger mounted on and movable bodily with said gauge pin and disposed in said casing, a scale in said casing, a pointer mounted within the casing and having one end thereof pivoted for swinging movement about an axis spaced from the path of movement of said operating finger and having its free end overlying said scale and adapted to traverse the same during swinging movement of the pointer, means at each end of said scale providing a limit stop for the pointer, a spring normally urging said pointer against one of said limit stops, an arm on said pointer projecting across the path of movement of said operating finger and designed for engagement with the latter, and a spring normally urging said gauge pin toward its advanced position to cause said operating finger to move said arm against the action of said other spring to yieldingly maintain said pointer against said other limit stop, said operating finger being adapted to move out of contact with said arm when said gauge pin is in its fully retracted position and the pointer engages said first mentioned limit stop.

5. A brake drum gauge comprising a casing, a gauge bar mounted in the casing for longitudinal sliding movement therein and having an end projecting therefrom, said gauge bar having a longitudinally facing arcuate reference surface, a gauge pin mounted in said casing for free longitudinal sliding movement parallel with said gauge bar, said gauge pin having an end projecting from said casing and having an arcuate measuring surface facing longitudinally oppositely from said reference surface, means for fixedly positioning said gauge bar in any selected one of a plurality of predetermined spaced positions for varying the normal distance between said surfaces, a pointer mounted in said casing for swinging movement on an axis adjacent said gauge pin, means for translating linear movement of said gauge pin into swinging movement of said pointer, and a scale disposed within the casing adjacent and for cooperation with the swinging end of the pointer.

6. A brake drum gauge comprising a casing, the casing having an upper main portion and a downwardly offset guide portion, a gauge bar mounted in said main portion with an end projecting therefrom and slidable longitudinally therein, reference means on said projecting end adjustable thereon longitudinally of the gauge bar and having a longitudinally facing arcuate reference surface, a gauge pin mounted in said lower portion parallel with said gauge bar and having an end projecting from the casing at the end thereof opposite the projecting end of said gauge bar, said gauge pin being freely slidable longitudinally and having an arcuate measuring surface directed longitudinally opposite said reference surface, means for fixedly positioning said gauge bar in any selected one of a plurality of predetermined spaced positions to vary the normal distance between said surfaces, said gauge pin being movable between a retracted position through a zero position to an advanced position to vary the distance between said surfaces, means urging said gauge pin toward its normal projected position, a pointer positioned in said main portion of the casing on a pivot axis adjacent the end thereof through which the gauge pin projects and having its swinging end adjacent the other end of the casing, means interconnecting said gauge pin and pointer for swinging the pointer in one direction in response to movement in one direction of said gauge pin, spring means biasing said pointer in the other direction, and a scale in said main portion of the casing positioned adjacent and for cooperation with the swinging end of the pointer.

HENRY ROBERT BILLETER.

References Cited in the file of this patent

UNITED STATES PATENTS

| Number | Name | Date |
|---|---|---|
| 597,335 | Spalding | Jan. 11, 1898 |
| 682,450 | Boulet | Sept. 10, 1901 |
| 1,157,800 | Oslund | Oct. 26, 1915 |
| 1,288,034 | Kirchner | Dec. 17, 1918 |
| 2,268,354 | Thomason | Dec. 30, 1941 |
| 2,274,275 | Phillips | Feb. 24, 1942 |
| 2,509,236 | Komar | May 30, 1950 |
| 2,553,525 | Burke et al. | May 15, 1951 |

FOREIGN PATENTS

| Number | Country | Date |
|---|---|---|
| 81,263 | Germany | May 11, 1895 |